United States Patent
Chang et al.

(10) Patent No.: US 8,830,116 B2
(45) Date of Patent: Sep. 9, 2014

(54) RADAR WAVE SENSING APPARATUS AND METHOD

(75) Inventors: Kuang-I Chang, Zhongli (TW); Sheng-Hang Wang, Hsinchu (TW); Yu-Jen Su, Kaohsiung (TW); Mu-Yu Tsai, Hsinchu (TW); Jyun-Long Chen, Zhongli (TW)

(73) Assignee: Industrial Technology Research Institute, Hsinchu (TW)

( * ) Notice: Subject to any disclaimer, the term of this patent is extended or adjusted under 35 U.S.C. 154(b) by 263 days.

(21) Appl. No.: 13/491,813

(22) Filed: Jun. 8, 2012

(65) Prior Publication Data

US 2013/0147653 A1    Jun. 13, 2013

(30) Foreign Application Priority Data

Dec. 7, 2011   (TW) ............... 100145152 A

(51) Int. Cl.
H02P 29/00 (2006.01)
H02P 7/00 (2006.01)
H02P 31/00 (2006.01)
G01S 13/88 (2006.01)
G01S 13/00 (2006.01)

(52) U.S. Cl.
USPC ............... 342/61; 318/255; 318/268; 73/570; 73/584; 73/596; 73/618; 73/620; 73/649; 73/658; 73/660; 342/104; 342/105; 342/115; 342/118; 342/134; 342/135; 342/165; 342/173; 342/175; 342/195

(58) Field of Classification Search
USPC ........... 73/570, 584, 596, 618, 620, 627, 649, 73/658, 660; 342/21, 22, 27, 28, 61, 342/70–72, 104, 105, 115, 118, 128–137, 342/165, 173–175, 192–197, 13; 340/425.5, 438, 442–444; 318/255, 318/268; 343/700 R, 703; 700/90, 275, 279; 219/50, 121.11, 121.6, 121.67, 121.68
See application file for complete search history.

(56) References Cited

U.S. PATENT DOCUMENTS 3,681,978 A * 8/1972 Mathias et al. ............... 73/660
3,713,154 A * 1/1973 Kummer ...................... 342/131
(Continued)

FOREIGN PATENT DOCUMENTS

CN    1721874 A    1/2006
CN    1764850 A    4/2006
(Continued)

OTHER PUBLICATIONS

English language translation of abstract of TW M259159 (published Mar. 11, 2005).

(Continued)

*Primary Examiner* — Bernarr Gregory
(74) *Attorney, Agent, or Firm* — McClure, Qualey & Rodack, LLP

(57) ABSTRACT

A radar wave sensing apparatus including a rotation element, a nanosecond pulse near-field sensor and a control unit is provided. The nanosecond pulse near-field sensor emits an incident radar wave and receives a reflection radar wave of the incident radar wave hitting on a surface of the rotation element to obtain a repetition frequency variation of the reflection radar wave corresponding to the incident radar wave. The control unit calculates a vibration of the rotation element according to the repetition frequency variation.

11 Claims, 2 Drawing Sheets

(56) References Cited

U.S. PATENT DOCUMENTS

| | | | | |
|---|---|---|---|---|
| 3,714,654 | A | * | 1/1973 | Wicks et al. .................. 342/13 |
| 3,798,643 | A | * | 3/1974 | Blore et al. .................. 342/104 |
| 3,909,584 | A | * | 9/1975 | Brienza et al. ............ 219/121.68 |
| 3,935,573 | A | * | 1/1976 | Johnson ........................ 342/104 |
| 4,543,463 | A | * | 9/1985 | Scuricini ................. 219/121.68 |
| 4,608,650 | A | * | 8/1986 | Kapadia ....................... 700/279 |
| 5,341,141 | A | * | 8/1994 | Frazier et al. ................ 342/129 |
| 5,371,718 | A | * | 12/1994 | Ikeda et al. .................. 342/104 |
| 5,424,749 | A | * | 6/1995 | Richmond .................... 342/192 |
| 5,446,461 | A | * | 8/1995 | Frazier ............................ 342/22 |
| 5,796,364 | A | * | 8/1998 | Fuchter et al. ............... 342/115 |
| 5,867,257 | A | * | 2/1999 | Rice et al. ..................... 342/192 |
| 6,064,472 | A | | 5/2000 | Drewling |
| 6,239,736 | B1 | | 5/2001 | McDonald et al. |
| 6,570,539 | B1 | * | 5/2003 | Snow et al. ................... 342/165 |
| 6,653,971 | B1 | * | 11/2003 | Guice et al. ..................... 342/27 |
| 6,853,328 | B1 | * | 2/2005 | Guice et al. ..................... 342/27 |
| 6,972,400 | B2 | | 12/2005 | Halmos |
| 7,148,840 | B2 | | 12/2006 | Dooi et al. |
| 7,248,205 | B2 | | 7/2007 | Uchino |
| 7,295,103 | B2 | * | 11/2007 | Muller et al. ................. 340/443 |
| 7,417,389 | B2 | * | 8/2008 | Shaw ............................ 318/268 |
| 8,026,840 | B2 | * | 9/2011 | Dwelly et al. .................. 342/28 |
| 8,314,732 | B2 | * | 11/2012 | Oswald et al. ............... 342/195 |
| 8,704,702 | B2 | * | 4/2014 | van Dorp ..................... 342/115 |
| 2005/0265124 | A1 | | 12/2005 | Smith |
| 2006/0279239 | A1 | * | 12/2006 | Hwang ......................... 318/268 |
| 2010/0204587 | A1 | | 8/2010 | Lin et al. |

FOREIGN PATENT DOCUMENTS

| | | |
|---|---|---|
| CN | 101441319 A | 5/2009 |
| CN | 201247325 Y | 5/2009 |
| CN | 101706668 A | 5/2010 |
| TW | M259159 | 3/2005 |
| TW | I231365 B | 4/2005 |
| TW | 200742232 | 11/2007 |
| TW | I306149 | 2/2009 |
| TW | I315597 | 10/2009 |
| TW | 200949223 | 12/2009 |
| TW | M381065 | 5/2010 |

OTHER PUBLICATIONS

English language translation of abstract of TW 200742232 (published Nov. 1, 2007).
English language translation of abstract of TW I315597 (published Oct. 1, 2009).
English language translation of abstract of TW 200949223 (published Dec. 1, 2009).
English language translation of abstract of TW M381065 (published May 21, 2009).
Balleri, A., et al.; "Frequency-Agile Non-Coherent Ultrasound Radar for Collection of Micro-Doppler Signatures;" IEEE; 2011; pp. 045-048.
Chen, V.C., et al.; "Micro-Doppler Effect in Radar: Phenomenon, Model, and Simulation Study;" IEEE Transactions on Aerospace and Electronic Systems; vol. 42; No. 1; Jan. 2006; pp. 2-21.
Li, C., et al.; "Non-Contact Measurement of Periodic Movements by a 22-40GHz Radar Sensing Using Nonlinear Phase Modulation;" IEEE; 2007; pp. 579-582.
Li, C., et al.; "Recent Advances in Doppler Radar Sensors for Pervasive Healthcare Monitoring;" Proceedings of Asia-Pacific Microwave Conference; 2010; pp. 283-290.
Stockman, J., et al.; "Doppler Radar Detection of Mechanically Resonating Objects;" IEEE; 2005; pp. 130-133.
Chen, V.C.; "Analysis of Radar Micro-Doppler Signature with Time-Frequency Transform;" pp. 463-466 • IEEE, year 2000.
Setlur, P., et al.; "Micro-Doppler Signal Estimation for Vibrating and Rotating Targets;" IEEE; 2005; pp. 639-642.
"Study of Nano-Second Pulses Near-Field Sensing Device in Rotating Vibration Measurement;" 19th National Conference on Sound and Vibration; Jun. 2011; pp. 1-5.
TW Office Action dated Oct. 28, 2013, Patent office of the Republic of China.
English Abstract translation of CN101441319 (Published May 27, 2009).
English Abstract translation of CN201247325 (Published May 27, 2009).
Full English (machine) translation of CN101706668 (Published May 12, 2010).
English Abstract translation of TWI231365 (Published Apr. 21, 2005).

* cited by examiner

RADAR WAVE SENSING APPARATUS AND METHOD

This application claims the benefit of Taiwan application Ser. No. 100145152, filed Dec. 7, 2011, the disclosure of which is incorporated by reference herein in its entirety.

BACKGROUND

1. Technical Field

The disclosed embodiments relate in general to a radar wave sensing apparatus and a method thereof.

2. Description of the Related Art

As the high precision requirements expected by the machine tools are getting higher and higher, the requirements related to the unbalance and vibration of a rotation element also become crucial. Examples of the sensors used for measuring the vibration of a rotation element include the accelerometer, the speedometer, the force sensor and the acceleration sensing apparatus used in micro electro mechanical system (MEMS). Examples of the sensing apparatuses used for measuring the eccentricity of a rotation element include electronic displacement meter and dial indicator. Examples of the sensors used for measuring the vibration on a rotation surface of a rotation element in a non-contact manner include the laser interferometer, the triangulation laser displacement meter, the eddy-current displacement meter and the inductor current displacement meter.

The accelerometer is a most commonly used tool for measuring the unbalance generated in the measurement of the rotation element (that is, the rotator) of a machine tool. The accelerometer measures the vibration on a surface of a rotation element in an indirect manner. The dial gauge can only be used in the measurement of static deflection. If the dial gauge is used for measuring an object under high-speed rotation, the contact force may cause scratch on the surface and errors to the measurements of dynamic vibration of an object under rotation. Furthermore, measuring a rotation element in a contact manner may easily damage the surface of the rotation element and the sensor itself. Despite that the laser interferometer and the current displacement meter would be better choices, the laser interferometer is very expensive in cost and the current displacement meter is huge in size and have to take many factors into consideration in terms of use.

SUMMARY

The disclosure is directed to a radar wave sensing apparatus and a method thereof. A vibration of the rotation element is sensed with a radar wave in a non-contact manner. The sensed vibration is further sent to a control unit for subsequent processing. The rotation element of the disclosure also refers to a rotation object which is not an element of the apparatus of the disclosure.

According to one embodiment, a radar wave sensing apparatus configured to sense a rotation element is provided. The radar wave sensing apparatus includes a nanosecond pulse near-field sensor and a control unit. The nanosecond pulse near-field sensor is configured to emit an incident radar wave and for receiving a reflection radar wave of the incident radar wave hitting on a surface of the rotation element to obtain a repetition frequency variation of the reflection radar wave corresponding to the incident radar wave. The control unit is configured to calculate a vibration of the rotation element according to the repetition frequency variation.

According to another embodiment, a radar wave sensing method is provided. The method includes the following steps. A nanosecond pulse near-field sensor is configured to emit an incident radar wave and receive a reflection radar wave of the incident radar wave hitting on a surface of the rotation element to obtain a repetition frequency variation of the reflection radar wave corresponding to the incident radar wave. A control unit is configured to calculate a vibration of the rotation element according to the repetition frequency variation.

The above and other aspects of the disclosure will become better understood with regard to the following detailed description of the non-limiting embodiment(s). The following description is made with reference to the accompanying drawings.

Figure 1:
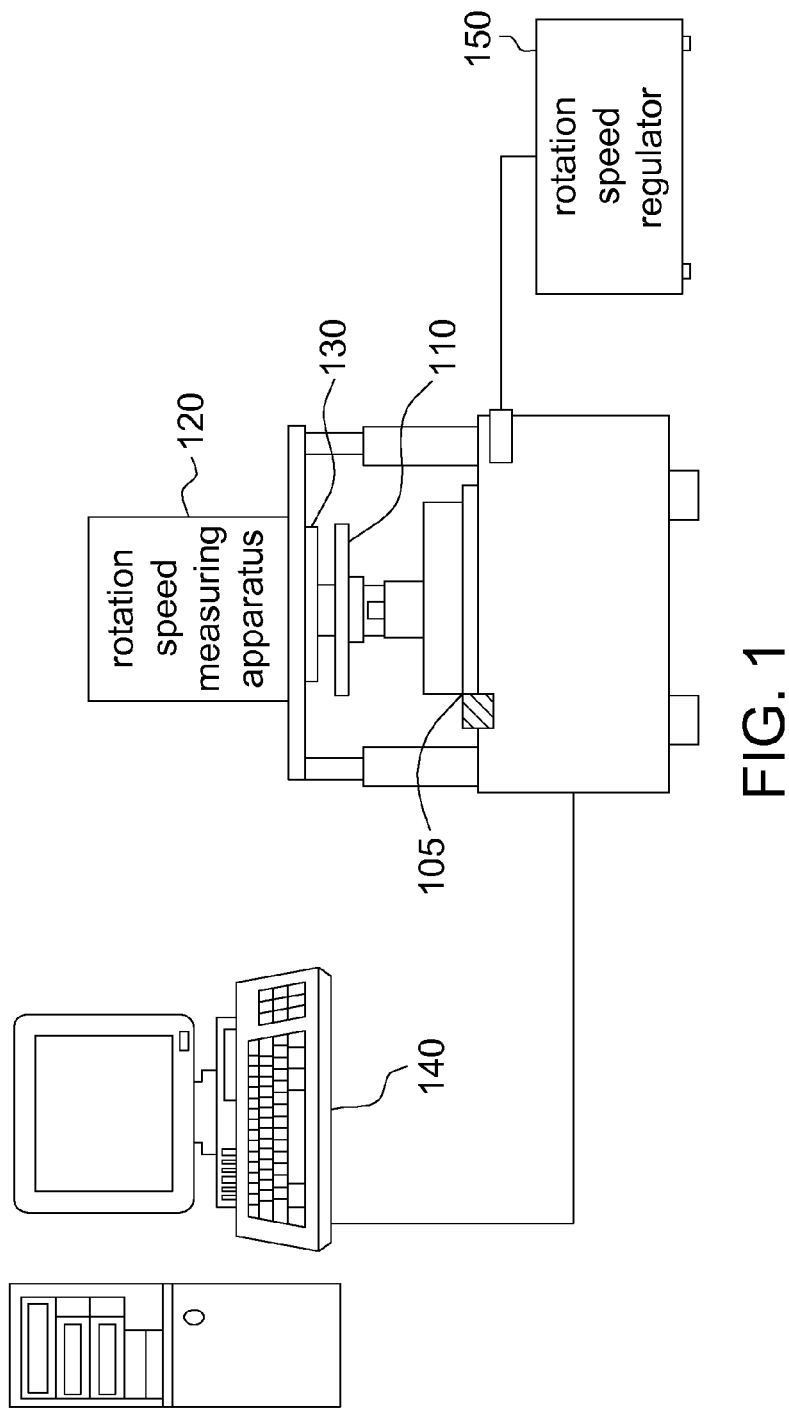
FIG. 1 shows a schematic diagram of a radar wave sensing apparatus according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The disclosure provides a radar wave sensing apparatus and a method thereof. A vibration of the rotation element is sensed with a radar wave in a non-contact manner. The sensed vibration is further sent to a control unit for subsequent processing for controlling a rotation speed or calculating a vibration of the rotation element according to the feedback.

Referring to FIG. 1, a schematic diagram of a radar wave sensing apparatus according to an embodiment is shown. The radar wave sensing apparatus 100, configured to sense a rotation element 110, includes a rotor installation platform 105, a nanosecond pulse near-field sensor 130, a control unit 140 and a rotation speed regulator 150. The rotor installation platform 105 is configured to carry the rotation element 110 to provide a calibration platform. The rotation element 110 may be realized by a standard rotator, but such exemplification is not for limiting the disclosure. In addition, the radar wave sensing apparatus 100 may further include a rotation speed measuring apparatus 120 configured to confirm the rotation speed of the rotation element.

The nanosecond pulse near-field sensor 130 is configured to emit an incident radar wave such as a high frequency electromagnetic wave. The nanosecond pulse near-field sensor 130 is further configured to receive a reflection radar wave of the incident radar wave hitting on a surface of the rotation element 110 to obtain a repetition frequency variation of the reflection radar wave corresponding to the incident radar wave. The control unit 140 may receive a repetition frequency variation obtained by a sensor through wire or wireless transmission with a wire/wireless communication module, and further calculate a vibration of the rotation element 110 according to repetition frequency variation. The wire/wireless communication module may be realized by a wired connection, such as Bluetooth apparatus, a WiFi apparatus or a radio frequency (RF) apparatus. In the present embodiment of the disclosure, the repetition frequency variation is substantially obtained through sensing according to Doppler effect.

As indicated in FIG. 1, if the rotation element 110 has a component of velocity vector along the direction from the rotation element 110 toward the nanosecond pulse near-field sensor 130, according to Doppler effect, the repetition frequency of the reflection radar wave will be moved compared to the frequency of the incident radar wave emitted from the nanosecond pulse near-field sensor 130. Let T denote the repetition period of the incident radar wave, whereas f denotes the repetition frequency, V(m/s) denotes a component of velocity vector of the rotation element 110, and d denotes the distance between neighboring pulses. Assume that the object moves to the receiver with the component of velocity V(m/s) and shifts at the distance VT(m). According to the Doppler Effect, the distance between neighboring incident and reflected pulses becomes equal to D as Formula (1).

$$D = d \pm VT \qquad \text{formula (1)}$$

Let $f_0$ denote the frequency of reflected pulses repetition, whereas $T_0(s)$ denotes the reflected pulses repetition cycle, and c denotes a light speed ($3 \times 10^8$ m/s). Then, formula (2) is obtained as follow:

$$f_0 = 1/T_0 = c/(d \pm VT) = f/(1 \pm V/c) \qquad \text{formula (2)}$$

Figure 2:
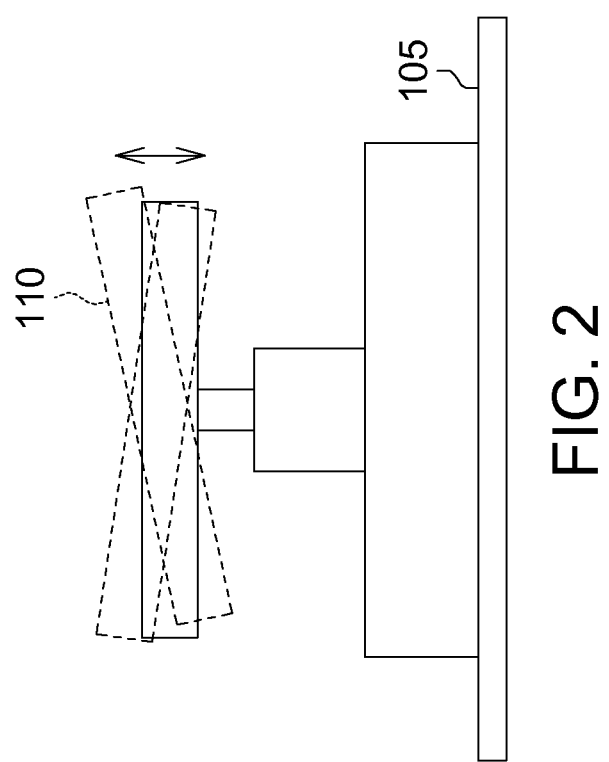
FIG. 2 shows a schematic diagram of a rotation element under high dynamic rotation according to an embodiment.

Thus, the frequency of reflected pulse repetition is dependent upon the signal frequency of the moving subject. The range of frequency vibration of the rotation element 110 may be obtained through sensing to a vibration of the rotation element 110. The vibration is a lateral or radial vibration of the rotation element 110 under high dynamic rotation as indicated in FIG. 2.

After obtaining a vibration of the rotation element 110 by way of sensing, the control unit 140 may further control the rotation speed regulator 150 to regulate the rotation speed of the rotation element 110 according to the feedback of vibration, and dynamic balance detection feedback control for high level smart type automation equipment can thus be implemented.

Also, the present embodiment of the disclosure further provides a radar wave sensing method including the following steps. A rotor installation platform is configured to carry a rotation element. A nanosecond pulse near-field sensor is configured to emit an incident radar wave and receive a reflection radar wave of the incident radar wave hitting on a surface of the rotation element to obtain a repetition frequency variation of the reflection radar wave corresponding to the incident radar wave. A control unit is configured to control a vibration of the rotation element according to the repetition frequency variation. The control unit is configured to control a rotation speed regulator to regulate the rotation speed of the rotation element according to the feedback.

The principles and operations of the radar wave sensing method are disclosed in the disclosure related to the radar wave sensing apparatus 100, and are not repeated here.

According to the radar wave sensing apparatus and the method disclosed in above embodiments of the disclosure, a vibration of a rotation element is sensed with a high frequency radar wave in a non-contact manner, and the obtained measurements have high precision. Conversely, the measurements obtained by using a conventional sensing apparatus and a method thereof are indirect, and are performed in a contact manner. After a vibration of a rotation element is sensed by using a non-contact high frequency radar wave, the sensed vibration is sent to a control unit for subsequent processing or adjustment, and the rotation speed is regulated accordingly. Since the radar wave sensing apparatus and the method disclosed in above embodiments of the disclosure can do without a laser interferometer, which would otherwise be required in conventional method, the costs are much more controllable and affordable.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A radar wave sensing apparatus configured to sense a rotation element, comprising:
   a nanosecond pulse near-field sensor configured to emit an incident radar wave and to receive a reflection radar wave of the incident radar wave hitting on a surface of the rotation element to obtain a repetition frequency variation of the reflection radar wave corresponding to the incident radar wave; and
   a control unit configured to calculate a vibration of the rotation element according to the repetition frequency variation.

2. The radar wave sensing apparatus according to claim 1, further comprising:
   a rotor installation platform configured to carry the rotation element.

3. The radar wave sensing apparatus according to claim 1, wherein the control unit comprises a wire/wireless communication module to receive the repetition frequency variation.

4. The radar wave sensing apparatus according to claim 1, further comprising a rotation speed regulator to regulate the rotation speed of the rotation element.

5. The radar wave sensing apparatus according to claim 4, wherein the control unit further controls the rotation speed regulator to regulate the rotation speed of the rotation element according to the feedback of the vibration.

6. The radar wave sensing apparatus according to claim 1, further comprising a rotation speed measuring apparatus configured to measure the rotation speed of the rotation element.

7. A radar wave sensing method, comprising:
   emitting an incident radar wave and receiving a reflection radar wave of the incident radar wave hitting on a surface of the rotation element by a nanosecond pulse near-field sensor to obtain a repetition frequency variation of the reflection radar wave corresponding to the incident radar wave; and
   calculating a vibration of the rotation element according to the repetition frequency variation by a control unit.

8. The radar wave sensing method according to claim 7, further comprising:
   receiving the repetition frequency variation by a wire/wireless communication module of the control unit.

9. The radar wave sensing method according to claim 7, further comprising:
   regulating the rotation speed of the rotation element by a rotation speed regulator.

10. The radar wave sensing method according to claim 9, further comprising:
    controlling the rotation speed regulator according to the feedback by the control unit to regulate the rotation speed or vibration of the rotation element.

11. The radar wave sensing method according to claim 7, further comprising:
    measuring the rotation speed of the rotation element by a rotation speed measuring apparatus.

* * * * *